United States Patent [19]

Hargarten et al.

[11] Patent Number: 4,696,709
[45] Date of Patent: Sep. 29, 1987

[54] PROCESS FOR PRODUCTION OF AN EXPANDED POLYOLEFIN PANEL

[75] Inventors: Werner Hargarten, Windeck/Hoppengarten; Rudolf Kautz, Hennef, both of Fed. Rep. of Germany

[73] Assignee: Dynamit Nobel AG, Troisdorf, Fed. Rep. of Germany

[21] Appl. No.: 746,532

[22] Filed: Jun. 19, 1985

[30] Foreign Application Priority Data

Jun. 19, 1984 [DE] Fed. Rep. of Germany ....... 3422682

[51] Int. Cl.⁴ .................... B32B 31/14; B32B 5/20
[52] U.S. Cl. ..................... 156/79; 156/220; 156/277; 428/159; 428/319.9
[58] Field of Search ............... 156/78, 79, 209, 220, 156/277; 427/244; 428/159, 319.9

[56] References Cited

U.S. PATENT DOCUMENTS

| | | | |
|---|---|---|---|
| 3,464,934 | 9/1969 | Birkett et al. | 428/159 |
| 3,870,591 | 3/1975 | Witman | 428/159 |
| 4,217,385 | 8/1980 | Shortway et al. | 428/159 |

*Primary Examiner*—Robert A Dawson
*Attorney, Agent, or Firm*—Antonelli, Terry & Wands

[57] ABSTRACT

A process for producing an expanded or foamed polyolefin panel with a decorative surface wherein a polyolefin or a mixture of a polyolefin with rubber and/or a synthetic resin miscible therewith is blended homogeneously with a crosslinking agent and a blowing agent and shaped into a panel-like matrix below the decomposition temperature of the blowing agent and the activation temperature of the crosslinking agent; a film of a thermoplastic synthetic resin, imprinted in accordance with a pattern with printing ink on one surface side, is applied unilaterally or bilaterally to the matrix, with the imprinted surface side facing the matrix; and then the matrix, with the film applied, is crosslinked and expanded by heating to a temperature above the activation of the crosslinking agent and the decomposition temperature of the blowing agent.

6 Claims, 4 Drawing Figures

PROCESS FOR PRODUCTION OF AN EXPANDED POLYOLEFIN PANEL

The invention relates to a process for the production of an expanded or foamed polyolefin panel wherein a polyolefin or a mixture of a polyolefin with rubber and/or a synthetic resin miscible therewith is blended homogeneously with a crosslinking agent and a blowing agent and shaped into a panellike matrix below the decomposition temperature of the blowing agent and the activation temperature of the crosslinking agent, and a film of a thermoplastic synthetic resin, especially a polyolefin containing film, is applied at least on one side of the matrix, and then the matrix, with the film applied, is expanded and crosslinked by heating to a temperature above the decomposition temperature of the blowing agent and the activation temperature of the crosslinking agent.

A process for producing an expanded polyolefin laminate is known from DAS No. 1,694,194 wherein a lining is applied to a matrix containing a crosslinking agent and a blowing agent, and, after expansion, the thus-produced laminate can additionally be subjected to an embossing treatment. In this way, expanded polyolefin laminates are created which have a decorative surface. It is also additionally possible to thereafter imprint or flock the thus-manufactured expanded polyolefin laminates. It is known from DAS No. 2,607,877 to produce expanded polyolefin laminates bonded on one or both sides to a thin synthetic resin film.

The invention is based on the object of providing an expanded polyolefin foam panel exhibiting a decorative and adequately rugged surface.

This achieved, by imprinting the film, which subsequently comes in contact with the matrix, on one surface side with printing ink in accordance with a pattern, by placing the film with the imprinted surface side in contact with the matrix, and by taking advantage of the fact that during expansion and crosslinking of the matrix, the areas carrying printing inks will expand somewhat more vigorously than the regions not provided with printing inks so that slightly raised, imprinted zones are formed on the surface of the expanded polyolefin panel.

The invention effects, in one process step, no only a coloring of the foam panel in accordance with the pattern, but also a slight profiling of the surface at the same time, in correspondence with the imprinted areas. This result is completely surprising inasmuch as it could nowise be foreseen that the matrix, in the imprinted areas, i.e. those areas to which printing ink has been applied, would expand more vigorously than in the remaining zones. The invention can be realized with special advantage in connection with polyolefin films, particularly polyethylene films, which films should be transparent to translucent so that the color print can show through. When using polyolefin films, these films should have been subjected to a surface treatment with an oxidizing effect, for example by means of corona discharge. Suitable for the imprinting of the polyolefin films are, commercially available printing inks that contain binders and colorants, as well as solvents, if desired and that are known to be suitable for printing of polyolefin films. For imprinting the polyolefin films, the aniline printing method (flexographic printing) can be utilized advantageously. Also the intaglio printing process can be used advantageously for relatively large quantities to be printed. Conventional printing inks for imprinting polyolefin films customarily contain nitrocellulose as the binder base. The colorants employed, pigments or dyes, depend on the coloring desired. The color print will normally range around 3 g/m$^3$. It is possible to imprint patterns, but also signatures or symbols, depending on the future field of use for the foam panel. It is to be kept in mind for the process of this invention that the print carried by the matrix will be enlarged together with matrix during crosslinking and expansion of the matrix, namely in every surface direction. The size of enlargement depends, in this connection, on the size of expansion of the matrix, i.e. on the final weight per unit volume of the expanded panel. For example, in the production of a foam panel having a weight per unit volume of 30 kg/m$^3$, the imprinted area will be enlarged in every surface direction twofold to threefold; in other words, the imprinted area is enlarged four to nine times. As a consequence, the color imprint will be spread out.

A thin polyolefin film is utilized for matrix lamination when the film serves practically only as a carrier for the printing ink and/or when the film is to provide additionally a fine, thin sealing of the surface of the foam panel. This thin film, for example in the range from 30 to 100 µm, is stretched during expansion of the matrix to such a great extent that it will be practically no longer visible on the finished foam panel. However, in cases where an additional surface finishing is to be attained by the laminated-on film, a thicker film will advantageously be employed, for example in the range from 100 to 500 µm. It is furthermore possible to additionally emboss the surface area of a foam panel, to which such a thicker film has been laminated, in a subsequent step.

The foam panels provided with decorations in accordance with this invention can be utilized, for example, as camping mats and can be equipped with stripes, squares, flowers, lettering; they can also be utilized as packaging materials and can be provided with a product labeling. It is also possible to employ the foam panels of the present invention in a more technical sense and provide the panels for example, with imprinted markings, thought being given in this connection to use the panels as protection against cold and heat in the form of insulation.

The quantities of printing ink applied range usually from 1 to 10 g/m$^2$, preferably 2-5 g/m$^2$.

The principle of manufacturing an expanded polyolefin panel has been described, in addition to being disclosed in the references heretofore mentioned, also, for example, in German Pat. No. 1,694,130.

The invention will be illustrated, in greater detail, below in the drawings by way of example. In the drawings.

Figure 1:
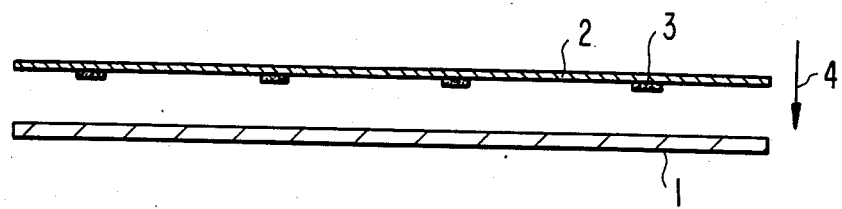
FIG. 1 is a schematic cross-sectional view of the matrix in the imprinted film.
Figure 2:
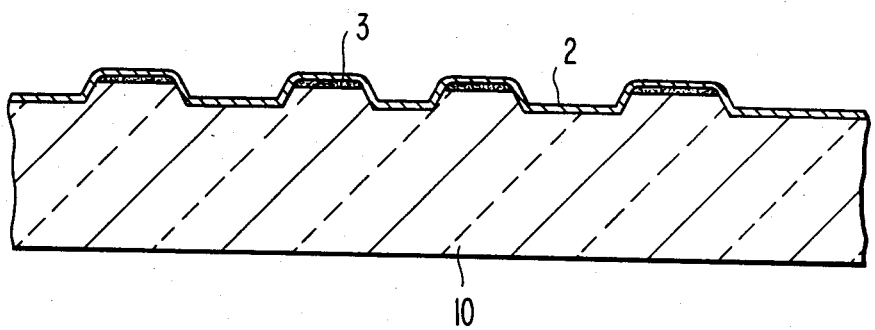
FIG. 2 is schematic cross-sectional view of an expanded polyolefin panel with imprinting.

FIG. 1 shows the matrix 1 schematically, i.e. a shaped polyolefin (e.g. polyethylene) panel or sheet containing a reactive blowing agent and a reactive crosslinking agent so that the polyolefin panel is still in the compact, i.e. unexpanded condition. This matrix 1 is then laminated unilaterally or bilaterally with a film 2, for example a polyethylene film, and after lamination the matrix is heated and is thus expanded and crosslinked. In correspondence with the three-dimensional expansion of the matrix 1, the film 2 also expands in width and length. The film 2 has been imprinted on one side with a pattern by printing ink, note the printed areas 3. The film 2 is then laminated with its imprinted side in the direction of arrow 4 onto the matrix 1. During the subsequent crosslinking and expansion, the product is then formed, as illustrated in a fragmentary view in FIG. 2 in cross section. The matrix is thus expanded into the foam panel 10 which is simultaneously crosslinked. This is a chemical crosslinking process, for example by means of an organic peroxide or like chemical crosslinking agent. In the areas 3 where the printing ink is on top of the matrix, the matrix is expanded somewhat more vigorously than in the remaining areas. In this way, slightly raised zones appear on the surface of the foam panel 10 in correspondence with the expansion of the matrix and the below has participated in the volume increase by stretching.

Figure 3:
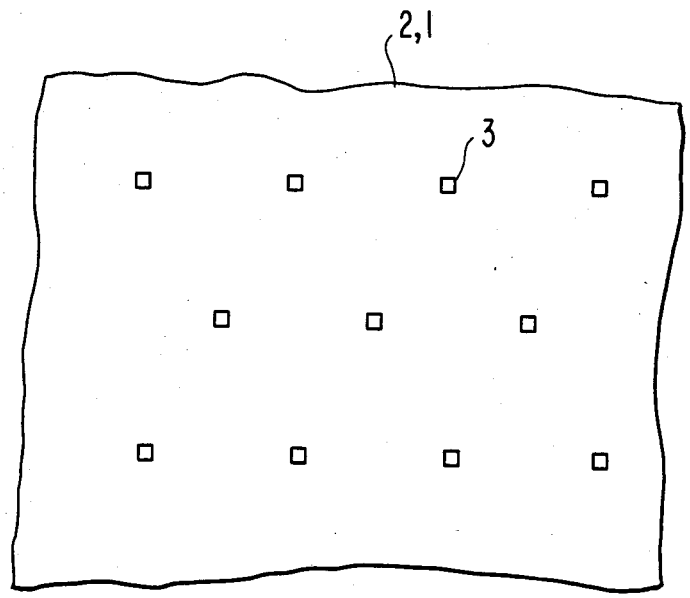
FIG. 3 is a top view of the film according to FIG. 1.
Figure 4:
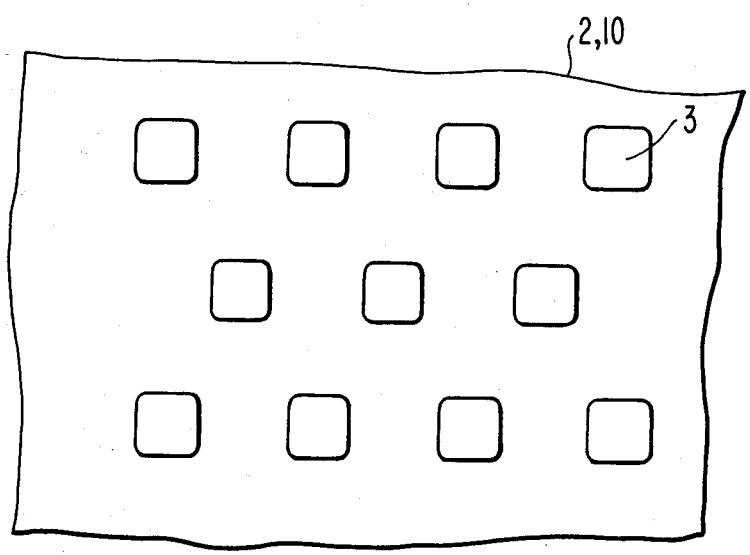
FIG. 4 is a top view of the foam panel according to FIG. 2.

A comparison of FIGS. 3 and 4 reveals the increase in volume and the enlargement of the surface area to which also the printed areas 3 are subjected after crosslinking and expansion.

What is claimed is:

1. A process for producing a foamed polyolefin panel wherein a polyolefin or a mixture of a polyolefin with rubber and/or with a synthetic resin miscible therewith is blended homogeneously with a crosslinking agent and a chemical blowing agent and shaped into a panel-like matrix below decomposition temperature of the blowing agent and below the activation temperatuare of the crosslinking agent, and a film of a thermoplastic synthetic resin, is applied unilaterally or bilaterally to the matrix, and then the matrix, provided with the film, is crosslinked and expanded by heating to a temperature above the activation temperature of the crosslinking agent and the decomposition temperature of the blowing agent, characterized in that the film is imprinted on one surface side with printing ink in correspondence with a pattern and is placed with the printed surface side onto the matrix, and that, during expansion and crosslinking of the matrix, the areas provided with printing inks are caused to expand somewhat more vigorously than the areas not provided with printing inks, so that slightly raised printed areas are formed on the surface of the expanded polyolefin panel.

2. A process according to claim 1, characterized in that the films employed are polyethylene films having a thickness of 30–500 μm.

3. A process according to claim 1 or 2, characterized in that printing inks are suitable for imprinting polyolefins, and contain binders and colorants.

4. A process according to claim 1, wherein the printing inks are conventional inks for printing polyolefins and are free of chemically reactive substances.

5. A process according to claim 2, wherein the films are polyethylene films which have been subjected to surface treatment with an oxidizing effect.

6. A process according to claim 1, wherein the printing inks are conventional inks for printing polyolefins and consist of binders and colorants.

* * * * *